(12) United States Patent
Zhi

(10) Patent No.: US 10,437,470 B1
(45) Date of Patent: Oct. 8, 2019

(54) DISK SPACE MANAGER

(71) Applicant: Amazon Technologies, Inc., Seattle, WA (US)

(72) Inventor: Xiqiang Zhi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 14/746,404

(22) Filed: Jun. 22, 2015

(51) Int. Cl.
*G06F 3/06* (2006.01)

(52) U.S. Cl.
CPC ............ *G06F 3/0604* (2013.01); *G06F 3/064* (2013.01); *G06F 3/067* (2013.01)

(58) Field of Classification Search
CPC ...... G06F 12/0246; G06F 3/067; G06F 3/064; G06F 3/0643; G06F 12/023; G06F 17/30091; G06F 2211/1028; G06F 3/0604
USPC .................. 711/103, E12.008, E12.001, 171
See application file for complete search history.

(56) References Cited

U.S. PATENT DOCUMENTS

| | | | | |
|---|---|---|---|---|
| 6,442,601 B1 * | 8/2002 | Gampper | ................ | H04L 29/06 709/218 |
| 6,502,106 B1 * | 12/2002 | Gampper | .......... | G06F 17/30902 707/769 |
| 7,117,294 B1 * | 10/2006 | Mi | ........................ | G06F 3/0605 711/101 |
| 2002/0165864 A1 * | 11/2002 | Azagury | ................... | G06F 8/61 |
| 2005/0108296 A1 * | 5/2005 | Nakamura | .......... | G06F 16/1724 |
| 2009/0199160 A1 * | 8/2009 | Vaitheeswaran | .... | G06F 11/3414 717/124 |
| 2011/0178997 A1 * | 7/2011 | Johnson | .................. | G06F 16/13 707/694 |
| 2012/0124319 A1 * | 5/2012 | Kirvan | ..................... | G06F 3/061 711/170 |
| 2013/0332645 A1 * | 12/2013 | Benhase | ............. | G06F 12/0806 711/103 |
| 2014/0173499 A1 * | 6/2014 | Wicks | .................... | G06F 3/0605 715/781 |
| 2014/0325133 A1 * | 10/2014 | Gaspard | ............. | G06F 12/0246 711/103 |
| 2015/0193299 A1 * | 7/2015 | Hyun | ...................... | G11C 29/52 714/6.24 |
| 2016/0028846 A1 * | 1/2016 | Coglitore | ............ | H04L 67/2842 709/204 |
| 2016/0080492 A1 * | 3/2016 | Cheung | ............... | H04L 67/1097 709/204 |
| 2016/0188229 A1 * | 6/2016 | Rabinovich | ......... | G06F 11/1464 711/114 |

* cited by examiner

*Primary Examiner* — Tuan V Thai
*Assistant Examiner* — Edward Waddy, Jr.
(74) *Attorney, Agent, or Firm* — Davis Wright Tremaine LLP

(57) ABSTRACT

In distributed processing frameworks, compute instance and cluster failure can occur due to a master node running out of disk space as a result of file system logs. An application employs a disk space manager to detect and manage available disk space based on a set of configurable directories. The disk space manager prevents a compute instance from reaching a threshold of capacity due to improper or malfunctioning component logging.

20 Claims, 6 Drawing Sheets

DISK SPACE MANAGER

BACKGROUND

Computing resource service providers and other large-scale users of computing resources often utilize configurable and scalable computing resources to meet various types of computing needs. A computing resource service provider, for example, is designed to share large amounts of computing resources and can be distributed among a large number of users, and may include multiple computing components configured to store and access data.

However, some of these computing components may fail from time to time and, if proper precautions have not been taken, the failure may result in a temporary loss of accessibility to some of the data stored on the computing resource service provider. As a result, when there is a failure, some applications or tasks that rely on access to data stored on the computing resource service provider may not operate properly while access to the data is being restored. In addition, the computing and storage resources of the computing resource provider may also be used to provide or support supplementary functions, such as providing measurements or statistics of their utilization to a service of the computing resource provider. The computing resource may be registered with the service in order to provide the measurements or statistics and the service may use the statistics to enable upward or downward scaling of allocated computing and storage resources.

BRIEF DESCRIPTION OF THE DRAWINGS

Various embodiments in accordance with the present disclosure will be described with reference to the drawings, in which.

DETAILED DESCRIPTION

Figure 1:
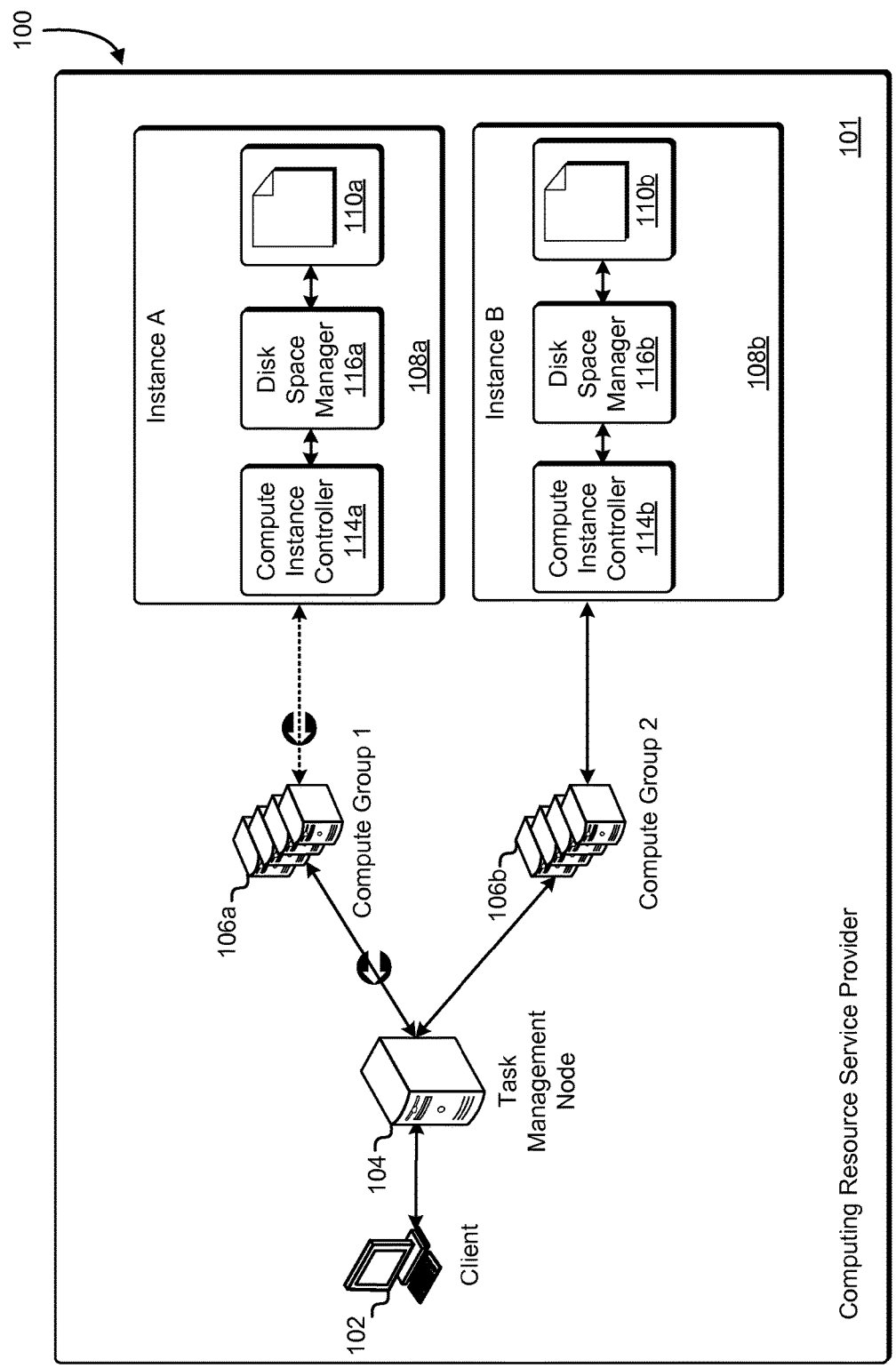
FIG. 1 illustrates a network topology and organization of the distributed file system of the invention in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include systems, methods, and processes for determining data-related attributes, such as size, availability, creation times, for data and/or data containers (such as volumes and file systems) resident on distributed storage systems. For example, a system for determining available computer storage space on a storage device (e.g., tape, disk, memory, etc.) in order to avoid instance run out of disk space due to log files and to avoid disturbances in a distributed file system due to low disk space because of log files.

Computer storage space (often referred to as storage space, memory space, or generally as "space") may be reclaimed by identifying certain file types to safely delete without causing system errors or disk corruption. For example, temporary files and/or log files may be maintained on the storage device unnecessarily, and may cause a storage instance to fall below a minimum threshold of available storage capacity.

In a distributed processing framework cluster (e.g., a Hadoop cluster), master and slave nodes may be configured to distribute and process data across dynamically scaleable virtual computer system service compute instances (e.g., virtual machines provided by a virtual machine service).

The distributed processing framework may be configured for data analysis, including performing log analysis, web indexing, data warehousing, machine learning, and the like. The framework may include a disk space management component (e.g., a disk space manager) configured to allocate and deallocate objects (e.g., files, pages, documents, etc.) within a database. The disk space management component may be implemented within an instance controller, and may be used to automatically detect and manage storage space of a storage device based at least in part on a set of configurable root log directories. The disk space management component may be configured to prevent a compute instance from running out of storage space due to component logging exceeding available thresholds.

The disk space manager may scan and analyze a directory, including compiling a hierarchical structure identifying files, at times in a recursive manner, to indicate directory information, such as file length, file creation time/date, file modification statistics, etc. The scans may be performed on different levels of a directory or multiple directories of the storage device. Based at least in part on a configuration policy, a disk space manager may detect whether a directory of a storage device consumes too much storage space than a threshold of storage space and compute an amount of stored files to delete to reclaim an amount of storage space. For example, the disk space manager may identify a file or files to delete according to file information, such as file length and file creation time, to enable additional storage space to be allocated as available for other storage needs.

The disk space manager may further be configured to apply a sequence of heuristics to determine candidate files to be deleted. The heuristics may favor larger file lengths and older file creation times/dates over smaller file lengths and newer file lengths to determine the candidate files to be deleted. Once one or more candidate files have been identified, the disk space manager may delete the candidate files and collect and display file deletion statistics (e.g., statistics related to size of storage space reclaimed).

FIG. 1 illustrates a computing resource service provider 100 in which various embodiments can be practiced. As will be appreciated, although a network environment 100 is used for purposes of explanation, different environments may be used, as appropriate, to implement various embodiments.

In this illustrative example, the environment includes a task management node that handles distributing the task submitted by the client 102, multiple compute groups 106 capable of performing distributed tasks, and a data nodes 108a and 108b connected to each compute node. The term "computing resource service provider" may be a distributed system that implements a platform for providing computing resources that are configurable and scalable to meet various types of computing needs. A computing resource service provider may be configured to share relatively large amounts of computing resources and can be distributed among a large number of users, and may include multiple computing components with configurable resources. In some embodiments, a distributed file system utilized by the computing resource service provider in providing services may also dynamically reallocate resources on demand.

As shown in FIG. 1, client 102 submits a distributed task that requires access to computer data 110a and 110b available in at least two instances (e.g., data nodes, compute instances, disks, etc.) 108a and 108b. The task management node 104 identifies that compute group 106A has access to the required computer data, submits the distributed task to compute group 106A to be run, the compute group runs the distributed task on a compute instance, and upon completion, returns the result. For example, the client 102 may be a customer of a computing resource service provider 101 composed of several configurable services such as virtual computing system service, networking services, storage services, database services, and so forth. The customer, through associated computing devices, can, through a remotely accessible application programming interface, such as a web service interface, scalably configure which services are used, how much of each resource is needed, how much to pay for a service, and more. The client may use the computing resource service provider to upload large collections of complex data, and executable instructions for processing/analyzing the data. Distributed tasks benefit greatly from the scalability of the computing resource service provider because they can quickly be scaled up or down to use resources based on the customer's needs.

The task management node 104 receives a distributed task from the client, and has one or more compute nodes perform the computational task. For example, in Hadoop, the management node may support MapReduce jobs. A MapReduce job includes a Map stage where the initial task is reduced into smaller sub-problems and distributed to multiple works in parallel, a Reduce stage where the answers to the sub-problems are collected and utilized to produce the result of the initial task. Upon receiving a MapReduce job, the management node may break up the job into several smaller tasks, run the tasks in parallel on separate compute nodes, and use the results from each task to compute the final job result.

The term "compute node" or "compute instance" may refer to a computing resource used in a computing resource service provider to execute a distributed task. A compute node can include computer hardware, computer software, and so forth. For example, a computer hardware server may an example of a compute node; additionally, a virtual machine instance running managed by a hypervisor and running within a computer hardware server is also an example of a compute node. As used herein, the terms "compute node" and "compute instance" are interchangeable. Compute instances are computer hardware, computer software, or a combination of computer hardware and software capable of running computational tasks. Examples of compute instances are computer hardware servers, virtual machine instances, and a configuration of computer hardware servers, hypervisors, and virtual machine instances. Each compute instance is capable of running computational tasks such as data processing tasks and is capable of accessing data stored in a distributed file system. Compute instances are also capable of storing and retrieving computer data, which may be stored within a compute instance (e.g., on a physical hard drive attached to a server), or simply accessible from a compute instance (e.g., on a removable external hard drive or a storage area network).

As used herein, a "distributed task" is a specific type of computational task that can be processed in a parallel, distributed manner. A distributed task can be divided into subtasks, and the subtasks can be further distributed from a parent node to child nodes. The child nodes in turn may do this again, leading to multi-level delegation. Child nodes process the subtask and return the result to the parent node. These subtasks can be performed in parallel—for example, one compute node can be used per subtask, allowing for large numbers of compute nodes to be used in parallel to complete large, computationally expensive tasks. In some distributed tasks, the parent node may use the subtask results of the work performed by the child nodes and produce the task result requested of the parent node. For example, a Hadoop MapReduce job is a distributed task.

A compute group (i.e., either of compute group 106a or 106b) comprises components capable of performing computational tasks, and includes both hardware components such as servers and software components such as virtual machine instances. Compute groups may contain a combination of both hardware and software components. A typical example of a compute group includes multiple servers, each server capable of running one or more virtual machine instances which in turn are capable of running one or more computational tasks. The multiple servers may be located on several racks.

A virtual machine instance contains an operating system (e.g., Linux) and data needed to launch a virtual machine in a virtual environment. The virtual machine instance may include a file system, the operating system and other components needed to boot up as a computer. In order to launch a virtual machine, hardware needs to be selected. The hardware selection may be accomplished through instance types, which may allow a variety of different sizes of memory, CPU performance, GPU performance, storage capacity, and other characteristics. The combination of the virtual machine instance and the instance type can be used to create an "instance" or a virtual machine, which may be launched on a computing resource, such as a host server computer in a multi-tenant network environment (i.e., a computing environment where different virtual machines are managed by different customers and, in some embodiments, where individual hardware computer systems are used to implement virtual machines for multiple customers). As used herein, the terms "virtual machine" and virtual machine instance" are interchangeable.

Instances 108a and 108b capable of storing computer readable data 110a and 110b may be accessed by compute nodes as part of performing a computational task or portion of a computational task. Instances may, for example, comprise local storage accessible only to a specific hardware component in a compute node (e.g., a hard drive attached to a server) or may be network storage accessible by multiple hardware components in a compute node (e.g., a storage area network). In some embodiments, the compute node and instance may be the same component (e.g., a VMI may both perform computational tasks and store computer readable data). The term "instance" may refer to a node in a distributed file system which is used for storing file data (e.g., one or more file blocks for at least one file). For example, a DataNode in a Hadoop distributed file system (HDFS) may be considered an example of a data storage node.

Example embodiments include a disk space manager configured to prevent component failure based on an amount of available storage resources, example embodiments may include preemptively and automatically adjusting available resource space based on size and age of files and file system logs stored on a storage device. Example embodiments include a compute instance controller 114*a* and 114*b*, which may be a computing device or server, either as software and/or hardware. The instance controllers 114*a* and 114*b* may include or be operably interconnected with a disk space manager 116*a* and 116*b*, which may be implemented as a component of a distributed processing framework, and configured to automatically detect when a storage device (e.g., a tape, disk, etc.) is approaching a storage capacity threshold (e.g., running out of memory). The disk space managers 116*a* and 116*b* may be configured to manage local disk space (e.g., the disk space of the disk, instance, logical partition, or the like) per each instance 108*a* and 108*b* of the compute groups, such as compute groups 1 or 2 (106*a* or 106*b*). The disk space manager decreases risks associated with a compute instance of the distributed processing framework being fully allocated, which may cause a customer of the instance to lose access to the instance. For example, a customer using the instance may be logging data unnecessarily, logging granular data, or causing the instance to enter a time loop that quickly causes the disk to be fully allocated and enter an out-of-memory situation.

In distributed processing frameworks, such as HDFS, logging processes may create large amounts of file system logs that are stored on the compute instance (or other disk space), which may lead to the instance reaching or exceeding a maximum threshold of capacity, and may even cause an entire cluster to fail. The disk space manager may be a management component implemented within an instance controller, and may be used to automatically detect and manage storage space of a storage device based at least in part on a set of configurable root log directories. The disk space management component may be configured to prevent a compute instance from running out of storage space due to component logging exceeding available thresholds.

In further example embodiments, a sub-system selects a virtual machine image from the virtual machine image data store to determine the file structure of the selected virtual machine image and determine the provenance for the selected virtual machine image. The management sub-system may utilize one or more heuristics to identify the logical data tree structure of the selected virtual machine image to determine the file structure. For instance, the management sub-system may begin determining the file structure of the virtual machine image by selecting a root directory of the image and determining the files and directories that may be included therein. If there is a directory present, the management sub-system may access the directory and proceed further into the virtual machine image file structure until the management sub-system identifies a terminal node within the logical data tree structure (e.g., a location within the virtual machine image that does not include any additional directories). The management sub-system may graph the logical data tree structure for the selected virtual machine image up to these terminal nodes for all directories.

Example embodiments of the disk space manager may be configured to compile and provide information related to files, folders, and drives of a disk. For example, information may include folder/drive space (e.g., total space available, compressed space, space being used by different file types, etc.), according to units of volume (e.g., bytes, megabytes, kilobytes, gigabytes, etc.) or percentages, number of files, cluster sizes of drives, etc. The disk space manager may further be configured to identify time stamps of files, directories, subdirectories, and the like based on creation and/or modification information (e.g., the age of a file), such that files may be analyzed based at least in part on the storage space occupied according to the creation/modification time and/or date stamp associated therewith. Example embodiments of the disk space manager are further configured to identify a size of a file, folder, or subdirectory. For example, the disk space manager may analyze the storage space, based at least in part, on file and subdirectory sizes in order to filter files according to size (e.g., a file size in bytes, megabytes, etc.).

Figure 2:
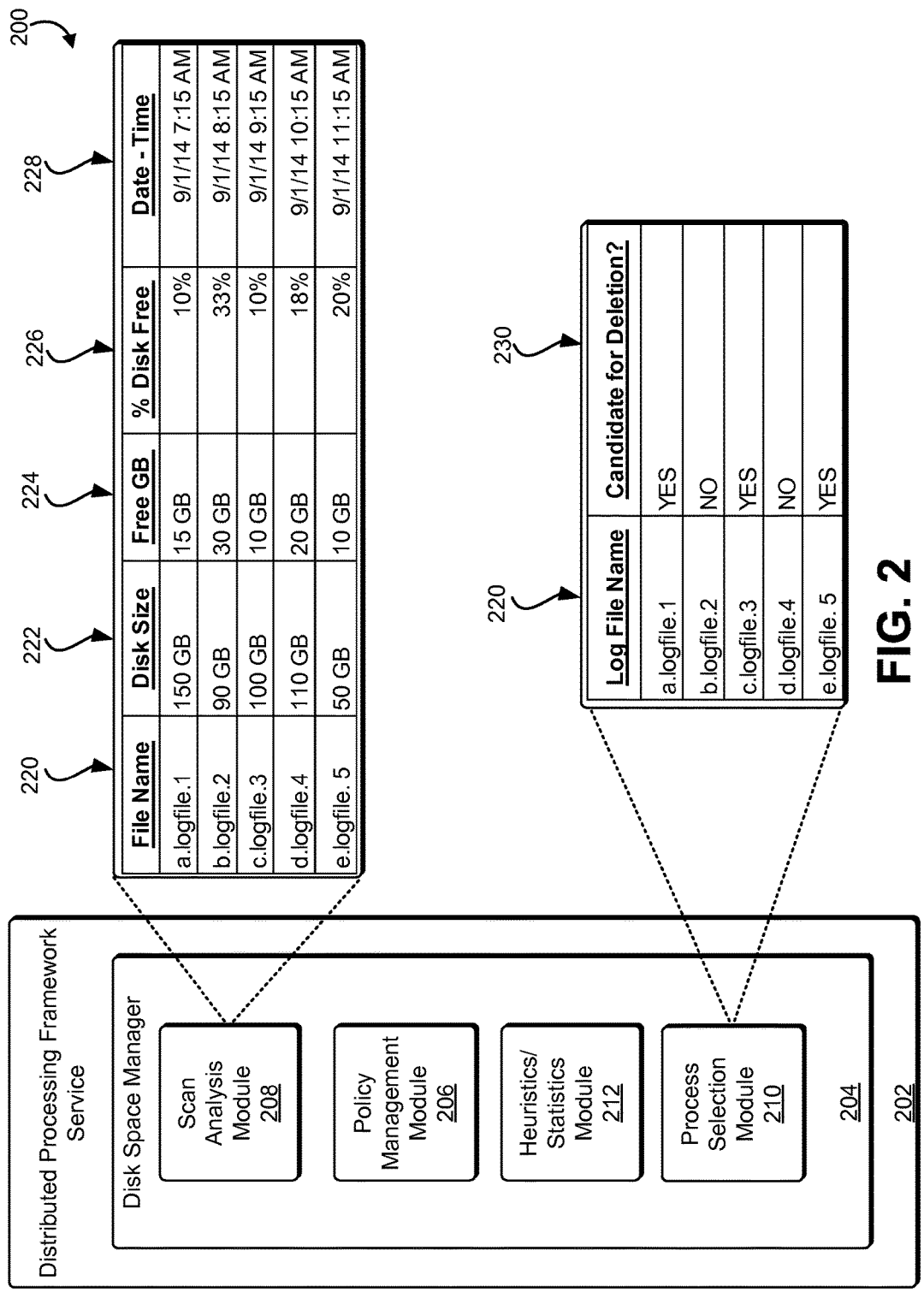
FIG. 2 is an illustrative example of a block diagram showing a disk space manager in which various embodiments can be implemented.

FIG. 2 is an illustrative example of a block diagram 200 showing a disk space manager and components of a distributed processing framework for use in allocating and reallocating available disk space in which various embodiments can be implemented.

Distributed processing framework service 202, such as a Hadoop framework described and depicted in connection with FIG. 1, may include a disk space manager 204 configured to maintain available disk space on all storage devices so as to avoid out-of-memory scenarios. In some example embodiments, the disk space manager 204 may be physical machines located within the computer system environment. The disk space manager may perform scans or sorting of the files stored on the disk, such as scanning all files stored on the disk, at different periodic cycles. For example, the disk space manager may periodically perform a scan of the disk every 30 seconds, 1 minute, 1 hour, 1 day, etc., depending on the type of disk and/or the uses for the disk.

In some embodiments, the disk space manager may be guest virtual machines operating on physical machines or a component thereof located within the computer system environment. For example, a scan analysis module 208 may be configured to conduct scans of storage devices to detect log file names 220, disk or logical partition sizes 222, amount of free space on the storage device (e.g., disk) 224, a percentage of free space 226, a date and time stamp information related to the last modification time of the log file 228. For example, a scan analysis module 208 may perform a shallow scan generally to instances having more than a certain percentage or certain amount of disk space available. For example, for a storage device having greater than 50% of available disk space, a deep scan is unnecessary because the storage device has enough space available without having to delete additional log files. For example, the shallow scan analysis of an instance or storage device, such as a disk, may include a simple request for information to determine the total size of the disk and the amount of free space on the disk. This may also include, or otherwise include, the total size of the disk and a percentage of free space on the disk.

In further example embodiments, the process selection module 210 may be configured to make the selection of files 220 to determine if the files are candidates to be deleted 230. For example, if the log files are of a size and age (e.g., the time/date stored) identified as being appropriate for deletion, the files are selected as candidates 230 and are marked for deletion. For example, the disk space manager 204 running on a compute instance with 200 GB of total storage space may perform a disk space scan every 30 seconds to determine if the compute instance has enough available free space. The compute instance may store 10,000 files on the 200 GB, such that between data making use of the instance and logs being purposely or accidentally generated and stored, the 200 GB may be filled very quickly. For example, 5 GB per hour of log files could be generated, where the log files may be large or small. As the log files are stored, in a matter of two days, the disk space will be almost completely full. Note that, while FIG. 2 shows a single file per disk, the process selection module 210, in various embodiments, is configured to select multiple files per disk and may make such selection across all files of each disk or across all files of a subset of all files (that is fewer than all files) of each disk.

In other example embodiments, a deep scan of a storage device or instance may be performed, even when the disk has sufficient available disk space. For example, a deep scan may include performing a recursive analysis of all files under a parent root directory (also referred to as a root directory), where the deep scan may monitor and review each file, folder, directory, sub-directory, etc. of the root node in an iterative function through to an end node, such as the last file under the root directory. A deep scan may be productive to perform on a storage device containing plenty of available disk space (e.g., greater than 30% or greater than 50% free disk space) because an identification and/or listing of all files of a storage device as the files may have a configuration policy identifying an amount of log space allowed or allocated for the storage of log files. For example, a configuration policy, provided by the policy management module 206, may identify an amount of log space being proportional to the amount of total disk space for the storage device. In such an example embodiment, the configuration policy provides for detection of possible candidate files to be deleted when the disk space is nearing a quota, such as a configuration quota for the instance (e.g., no log space to exceed 20 GB). A "log" may be a file system log, which is a data structure of a log-structured file system to which records may be appended sequentially.

Further example embodiments involve a parent root directory, based on configuration policies, being scanned via a recursive analysis algorithm of each file under the root directory to collect data related to each file. For example, the data related to each file may be a statistic or set of statistics related to a size of a file or a timestamp associated with a file (e.g., a time and date associated with a last modification of the file). Further example statistics may be related to a date of creation of a file, a time/date of a modification of a file, where the modification may be a write command to the storage device.

Example embodiments involve the heuristics/statistics module 212 being configured to determine statistics to be used according to file type, file size, device type, etc. The module 212 may further be configured to create scheduled scans and/or monitoring of one or more storage devices and/or root directories in order to continuously update information related to different statistics and to provide the updated statistics information to a process selection module 210. In some embodiments, the process selection module 210 may be physical machines located within the computer system environment. In some embodiments, the process selection module may be guest virtual machines operating on physical machines or a component thereof located within the computer system environment. The process selection module 210 may use the updated statistics information as a component of a selection algorithm to identify files as candidates to delete. The selection process may include a number of bytes to delete based at least in part on disk space; the disk space allotted may be determined according to one or more configuration policies.

For example, a configuration policy, as maintained and/or created by a policy management module 206, which may be a computing device located within a computer system environment, such as a server or host machine, and may provide for a storage device, such as a disk to maintain no more than 20% of the disk space to be used for logs, and no less than 200 GB, for example, of disk space to be used by logs. The configuration policies may be the same or different for all instances in a distributed network. Based on these configuration policies, the process selection module 210 may compute a number or a percentage by unit (e.g., by bytes, megabytes, etc.) to delete.

The selection process is then initiated. For example, the selection process may favor deleting older and/or larger file logs based on statistics determined during a scan and stored in the heuristics/statistic module 212, which may be a computing device located within a computer system environment, such as a server or host machine. For example, the log file size is first searched for file sizes in the top ten percentile and older than an average age of all files based on statistics of the files (e.g., older than the median time since the last modification). It is then determined, at the process selection module 210, if deletion of the determined number of files will successfully delete enough space.

If so, the files are deleted and metadata related to the deleted files (e.g., statistics, time, size, heuristics, etc.) are recorded in the heuristics/statistics module 212 for later reporting and consideration. In further example embodiments, the statistics may be maintained in the heuristics/statistic module 212 such that the data may be made available for display on a user device, such that a customer of the distributed processing framework may view a visual representation of the different disk space availabilities. For example, providing information related to the deleted files may include providing information configured to be displayed for review. For example, the statistics module may provide the metadata and related information associated with the deleted files in a file type that a customer may render on a customer computer (e.g., generate an image that is streamed over a network for review by a customer or administrator).

However, if the deletion of said files did not make available enough disk space, additional iterations must be made. For example, if the initial selection process exhausts all possible files based on the first criteria, a next level or type of criteria may be used to filter the files. A next iteration of the selection process may include using more relaxed criteria. For example, the statistics module 212 provides statistics related to files within the top $20^{th}$ percentile of file sizes and files within the top $50^{th}$ percentile of age (e.g., where age is the time of the last modification of the file).

The selection module continues to perform such iterations according to this or similar processes for as many passes are necessary to successfully delete enough log files to reclaim the computed amount of disk space. Depending, for example, on the storage device, the file statistics may be parsed based on files less than an hour old, less than five minutes old, less than two minutes old, in order to delete the computed amount of disk space. In some example embodiments, the selection process may determine that almost all files must be deleted, except for exempt files. For example, exempt files may be all files less than one minute old, or files that are persistently stored in the disk space.

Figure 3:
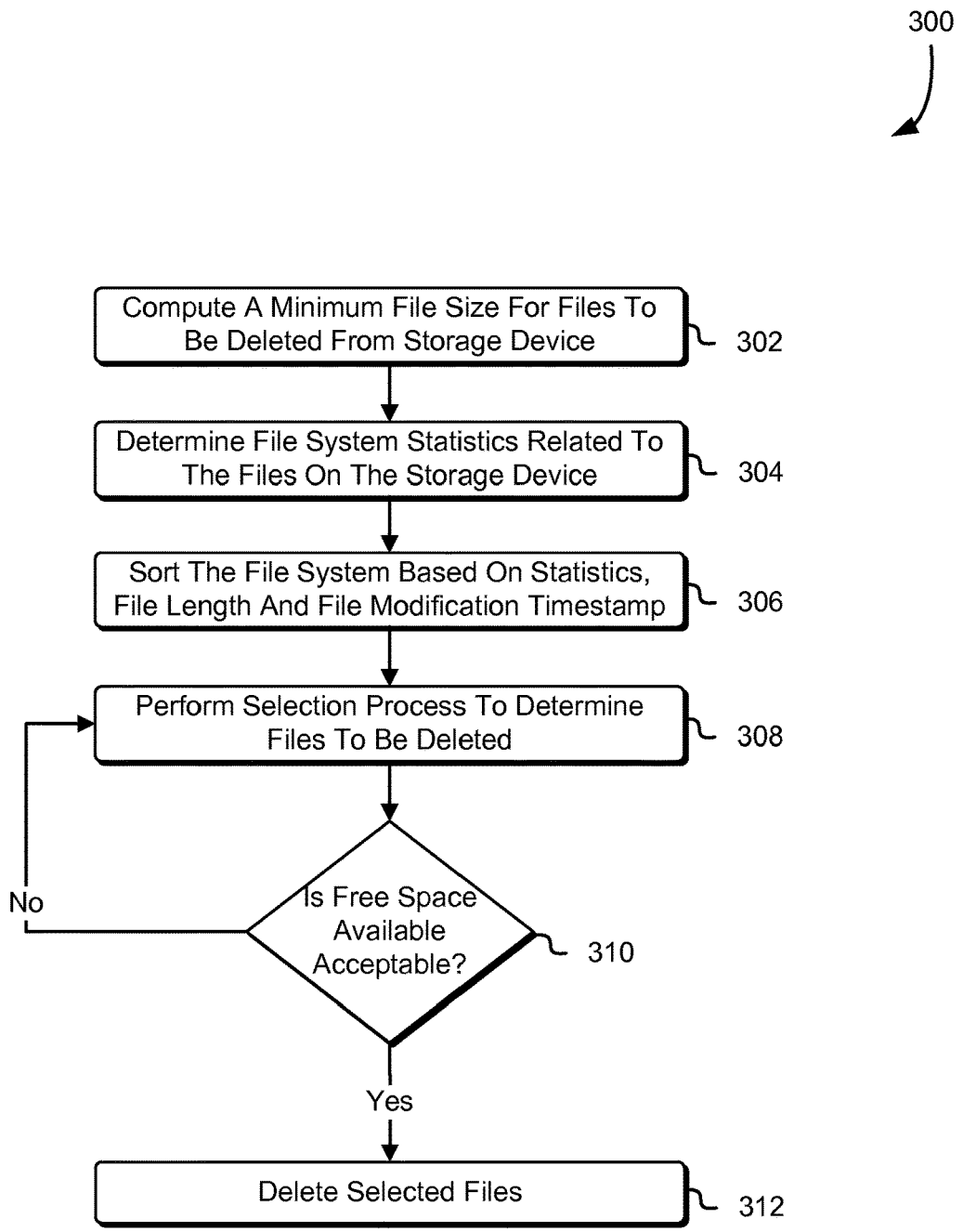
FIG. 3 is an illustrative example of a process for determining free disk space availability of a storage device in accordance with at least one embodiment.

FIG. 3 shows an illustrative example of the process 300 for determining free disk space availability of a storage device in accordance with an embodiment of this disclosure. The process 300 may be performed by any suitable system or combination of systems such as the environment described above in connection with FIG. 1. The process 300 may be performed by a computing resource service provider providing access to computer system resources such as user resources, policy resources, network resources and/or storage resources. Other entities operating with a computer system environment may also perform at least a portion of the process illustrated in FIG. 3 including, but not limited to, services, applications, modules, processes, operating system elements, virtual machine elements, network hardware, or combinations of these and/or other such entities operating within the computer system environment.

Returning to FIG. 3, in an embodiment, the process 300 includes a disk space manager computing a minimum file size for file system logs to be deleted from a storage device (302). The disk space manager may further be configured to determine file system statistics related to the files on the storage device (304). For example, the file system statistics may be any form of metadata or information related to the file system logs that may be used to categorize the file system logs, for example, the size of the logs or the age of the logs based on a last modification date/time.

Some or all of the process 300 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The process 300 further includes the disk space manager sorting the file system statistics based at least in part on a file length and a file modification timestamp (306). In example embodiments, the file sorting performed by the disk space manager may include a scan process that is performed periodically, such as every 30 seconds, 1 minute, 1 hour, or other periodic cycle or other determined time period. The scan may be performed in order to determine file information and/or statistics related to the files stored on the disk. The sorting may be performed in one or more batches; for example, the sorting may be done according to different criteria. For example, a first sort or scan may be performed according to a date stamp or time code in order to determine the relative age (a timestamp related to the time/date the file was created and/or stored) of the files stored on the disk. The relative age of the files may then be sorted according to the oldest file to the youngest file (e.g., the most recently stored file), or vice versa. A second sort may be performed according to file size, where the files may be sorted according to the largest file size to the smallest file size, or vice versa. The sort or scan process may be performed in order to determine file statistics (e.g., characteristics, metadata, etc.) for selection purposes to determine files to be candidates for deletion.

The disk space manager may further perform selection processing algorithms or decision blocks, as described above in connection with FIG. 2, to determine files to be deleted (308). For example, a selection process of files to be considered candidates for deletion may include using different criteria, where such criteria may be found in the file statistics. Examples of such criteria may be the ages of files and the sizes of files stored on the disk. In a first selection process, the first criteria may include searching for files of a certain size percentage and a certain age. For example, the first selection process may include a first criterion of files being in the top 10% of largest file sizes and files that are in the top 10% of oldest files.

The selection process may then determine if the selected files based on the first criterion are enough files to be deleted in order to provide enough free space on the disk (310). If the disk space manager determines that the selected files, once deleted, provide enough free disk space on the disk, then the selection process is complete and the selected files will be deleted (312). If, however, the disk space manager determines that the selected files, once deleted, will not provide enough free disk space on the disk, a second criterion is used for a second selection process (308). The second criterion may be searching for files of a certain percentage size smaller than the first criterion and files of a younger age (more recently stored files). For example, the second criterion may include files being in the top 30% of largest file size and files that are in the top 30% of oldest files.

If the selected files from the first and second selection processes, once deleted, provide enough free space on the disk, the selection process is complete and the selected files will be deleted (312). If, however, the free space would not be enough, a next selection process with a next criterion would be performed until the disk space manager determines that enough free space will be made available based on all of the selected files being deleted (308). Once the selection process is complete, then all of the selected files may be deleted (312). In alternative example embodiments, the selected files may be deleted interminttently between each sort or scan and next selection process.

The disk space manager may further be configured to determine, based at least in part on deleted files, if acceptable amounts of free space are available (310).

Figure 4:
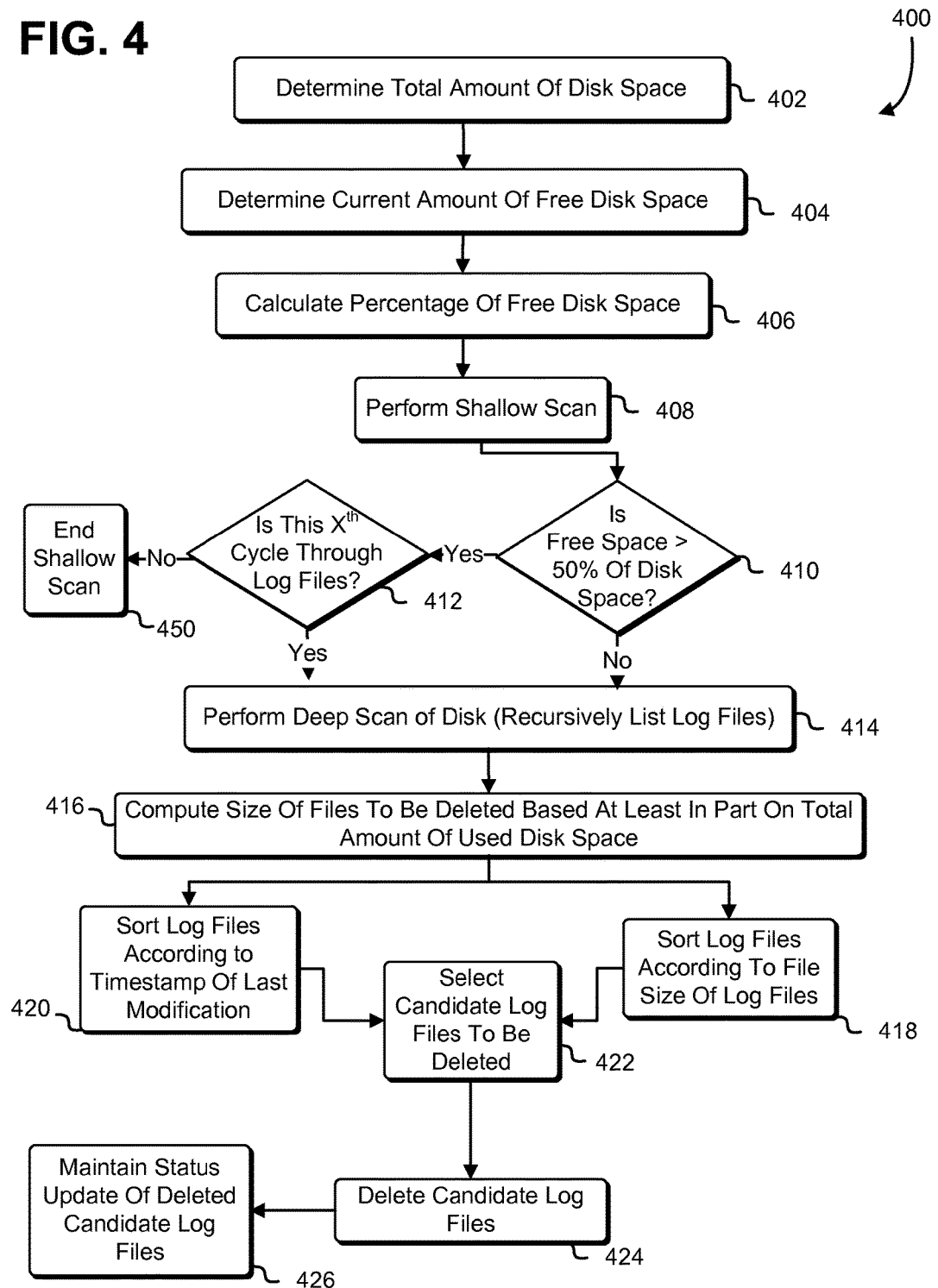
FIG. 4 is an illustrative example of a process for performing shallow scans and deeps scans of disk space in accordance with at least one embodiment.

FIG. 4 shows an illustrative example of the process 400 for performing shallow scans and deep scans of disk space in accordance with an embodiment of this disclosure. The process 400 may be performed by any suitable system or combination of systems such as the environment described above in connection with FIG. 1. The process 400 may be performed by a computing resource service provider providing access to computer system resources such as user resources, policy resources, network resources and/or storage resources. Other entities operating with a computer system environment may also perform at least a portion of the process illustrated in FIG. 4 including, but not limited to, services, applications, modules, processes, operating system elements, virtual machine elements, network hardware, or combinations of these and/or other such entities operating within the computer system environment.

Returning to FIG. 4, in an embodiment, the process 400 includes, at a disk space manager, determining a total amount of disk space of a storage device (402), such as a compute instance as described and depicted in connection with FIG. 1. The disk space manager may further determine a current amount of free disk space (404) available on the storage device and calculate a percentage of free disk space (406). The disk space manager may further perform a shallow scan (408) of the storage device, as described in connection with FIG. 2.

Some or all of the process 400 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Returning to FIG. 4, if the disk space manager determines that the free space available on the storage device is greater than 50% of the total disk space (410), the disk space manager may then determine if multiple scans or iterations of a scan have already been performed (412). It is noted that the provided thresholds are merely examples of percentages and amounts of threshold sizes, such as 50% of the total disk space, and other threshold amounts may be used. For example, if the disk space is greater than 50% of the total disk space, the disk space manager may only need to perform the shallow scan; however, if the root directory has been scanned more than a determined number of iterations (e.g., more than 10 cycles), the disk space manager may perform a deep scan in order to review the configuration policy status for the storage device (414). If, however, the determined number of iterations has not met a minimum required number, the process 400 may be completed, and the shallow scan may end (450).

Returning to the determination of the amount of free disk space, if the free space of the storage device is not greater than 50% of the total amount of disk space, the disk space manager will perform a deep scan of the disk (414). For example, the disk space manager may recursively list all log files in order to perform a full deep scan. The process 400 further includes computing, by the disk space manager, a size of files to be deleted based at least in part on the total amount of used disk space (416). Once the file size to be deleted has been computed, a selection process begins. The disk space manager performs a sorting of log files according to file size of the log files (418) and according to timestamps, such as dates and times, of the last modification made (420).

Based at least in part on the sorted files, the disk space manager is configured to select one or more candidate log files to be deleted (422). The selection is described in detail in connection with FIG. 3 above. The selection process may further include determining by the disk space manager, before files are selected, if the files are restricted or otherwise demarcated as files that may not be deleted. Once log files have been selected as appropriate files for deletion, the selection process is completed and the files are deleted (424). For log files that have been deleted according to the process 400, the disk space manager may forward metadata related to the deleted files to a data structure or log file to maintain status updates of the deleted candidate log files (426).

In alternative example embodiments, the process 400 may include performing selection and deletion steps intermittently. For example, before deleting the candidate files, the disk space manager must determine if the log file is in anyway restricted, for example, if the files timestamp is less than one minute old, the file may be restricted from being deleted. If the disk space manager determines that the log file is restricted, the disk space manager must return to select a next candidate log file to be deleted. If, however, the log file is not restricted, the disk space manager may delete the candidate log files. Further alternative example embodiments, may include determining if enough free space has been created based on the first selection of deleted log files. If the disk space manager determines that the required or requested amount of free space is now available, the deep scan of the log files is completed. If, however, the disk space manager determines that the free space available after the first selection of deleted log files has been completed is still below the required amount of available free space, the disk space manager returns to compute a new size of log files to be deleted based at least in part on the total amount of used disk space.

Figure 5:
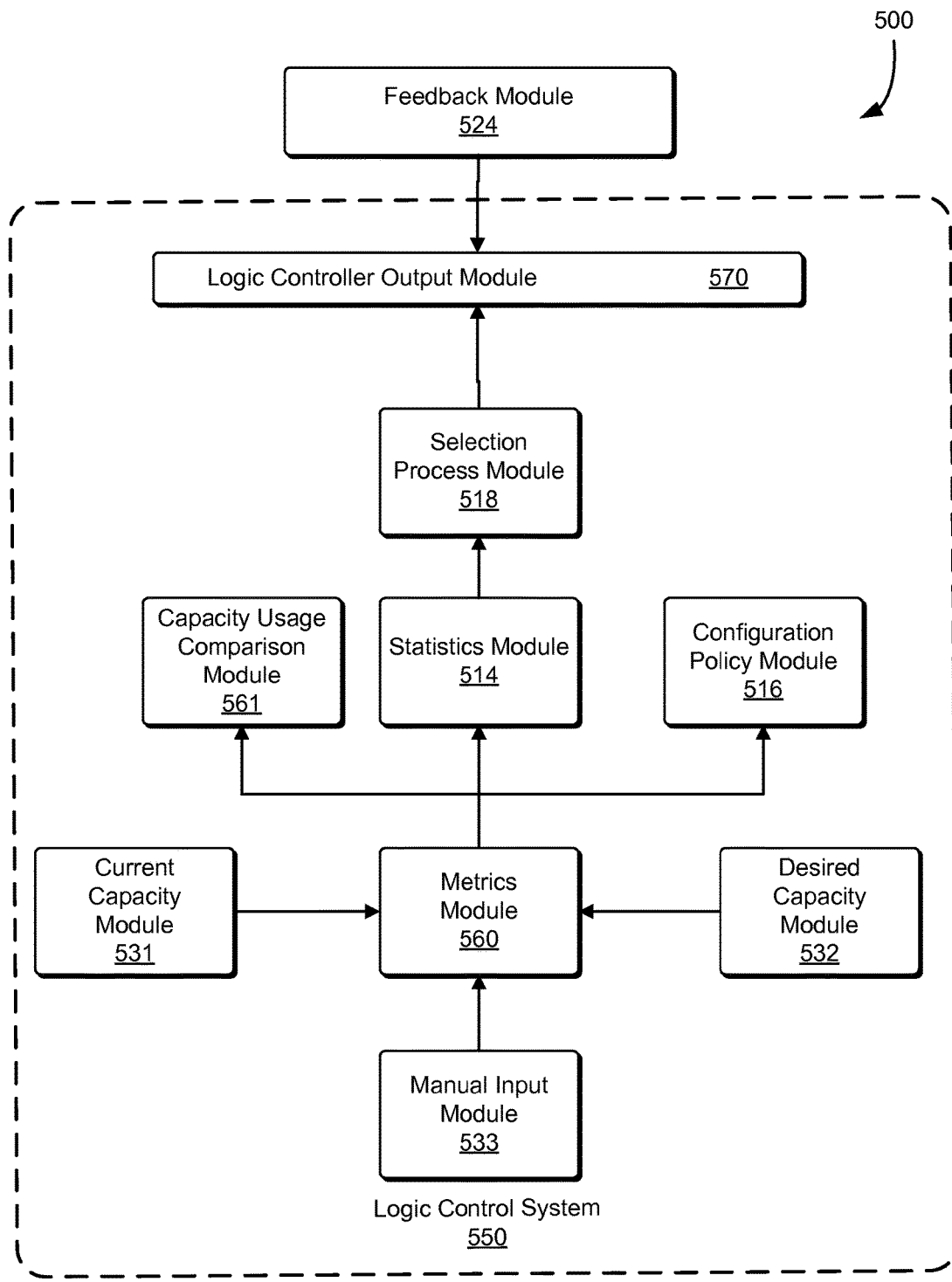
FIG. 5 is an illustrative example of a block diagram showing a logic control system for use with a distributed processing framework in accordance with at least one embodiment.

FIG. 5 illustrates an example of a control system 500 according to an example embodiment. The example embodiment includes a logic control system 550, which includes a current capacity module 531, metrics module 560, desired capacity module 532, manual input module 533, capacity usage comparison module 561, configuration policy module 516, statistics module 514, selection process module 518, and logic controller output module 570 and is operably interconnected to a feedback module 524. Logic control system 550 includes modules illustrating one example of a flow of data through the system in which a client, such as client 102 described and illustrated in connection with FIG. 1, is able to submit a distributed task that requires access to computer data available in at least two data nodes in a distributed processing framework, computing resource service provider network, or computing system.

An example embodiment of the logic control system 550 may include a control function, controller, or other component for providing a system configured, for example, to provide a wide range of operating conditions, including automatic tuning. An example embodiment of the logic control system may be any control system, such as a closed-loop or feedback control system. The logic control system could be a hardware device or any software program implemented in a hardware device. An example embodiment of a module may include, for example, a piece of hardware, a programming module with corresponding executable code, any software program implemented in hardware or any suitable computer device configured accordingly to have the capabilities described herein.

A logic controller, in some example embodiments being a portion of the logic control system, is configured to manage disk space availability on storage devices in a distributed processing framework. For example, the controller may be configured to determine the current capacity of a storage device according to the capacity module 531 and to determine or obtain the desired capacity information, such as the amount of free space desired to be available for log file storage, using the capacity module 532. In some example embodiments, a user, such as a network administrator or customer of the distributed processing framework, may override the current capacity data from the capacity module 531 by entering input into the manual input module 533. The metrics module 560 may maintain information related to the file system logs of a storage device, such as the metadata, structure information, file status, and the like under a root directory.

Returning to the logical control system 550 in FIG. 5, the controller of the logic control system 550 is further configured to provide the current capacity, desired capacity, and/or metrics module information to each of the capacity usage comparison module 561, statistics module 514, and the configuration policy module 516. The data or information may be provided at or around the same time to each of modules 561, 514, and 516 or at different times.

The capacity usage comparison module 561 includes a calculation module or process to calculate or determine the proportional function by comparing the current capacity and the desired capacity, for example, updates or changes to the amount of available free disk space.

The selection process module 518 provides the selected process to the logical controller output module 570, which is configured to process the information, and execute any deletion commands based on the selected process, the logic controller output 570 or a component operably interconnected therewith automatically provisions or instantiates additional resources for distributed processing framework. Alternative example embodiments include the logic controller output 570 determining to reduce computing resources and automatically reducing some or all of the resources associated with the customer application. In alternative example embodiments, the logic controller output 570 is further configured to receive or obtain feedback from a feedback module 524.

In alternative example embodiments, the logic controller may be configured to initiate changes or modifications to the resources without further customer input. For example, the logic controller may adaptively modify the resource allocations based on changes to the parameters or variables. In some example embodiments, the logic controller or other system component includes an adaptive intelligence that is configured to dynamically and/or automatically update available disk space.

Alternative example embodiments of the logic control system 550 are further configured to determine and/or create a scaling factor to be applied automatically and dynamically to adjust, allocate and/or de-allocate resources in response to a network event or network activity, such as requests for increased compute instances, fault-detections, or network partitions. Examples of a network event can include an aggregation of occurrences of events that are measured and used to determine whether to scale the availability of disk space.

Alternative example embodiments of FIG. 5 may include a computing resource service provider (not shown), such as the service provider 101 as described and illustrated in connection with FIG. 1, and may also include an account usage tracking module (not shown). The account usage-tracking module (not shown) may collect metrics or statistics on the usage of resources allocated to the customer. For example, the account usage-tracking module may collect metrics on the usage of the available disk space based on the storage device and may make the metrics available to the customer. Further, the metrics collected by the account usage-tracking module may also be provided to an automatic scaling module (not shown) and may be used by the automatic scaling module to dynamically scale the available disk space according to embodiments presented herein.

Figure 6:
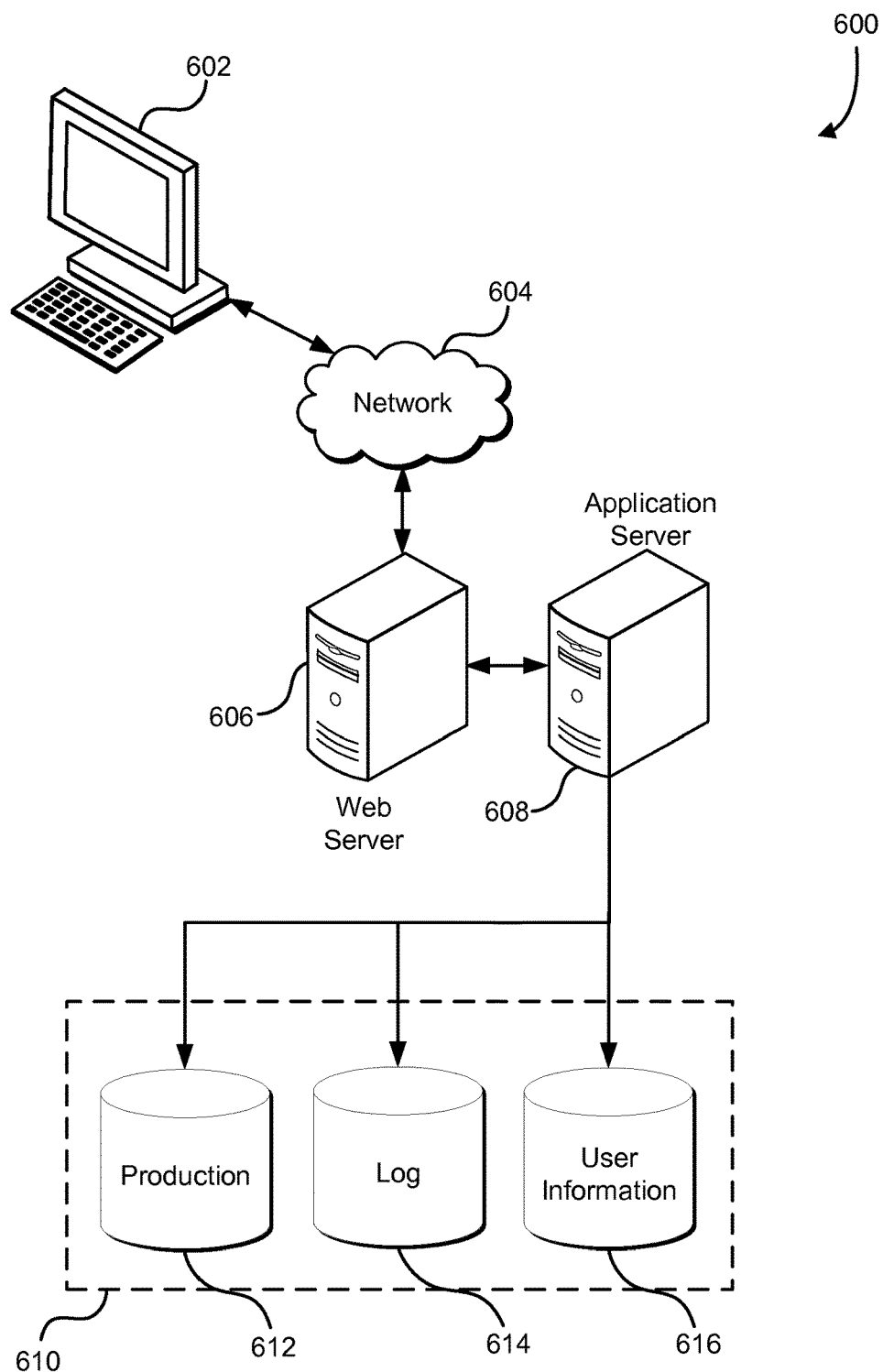
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages, or information over an appropriate network 604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 602 and the application server 608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 610 can include several separate data tables, databases, data documents, dynamic data storage schemes and/or other data storage mechanisms and media for storing data relating to a particular aspect of the present disclosure. For example, the data store illustrated may include mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. The application server 608 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting, at a web-based storage service, based at least in part on storage that is in excess of a storage capacity threshold of a storage device, a storage capacity indicating a percentage of a total storage capacity of the storage device;
    determining, based at least in part on the storage capacity, a quota size for files to remain on the storage device and a type of scan to be performed;
    computing, based at least in part on statistics related to files stored on the storage device and the storage capacity, a minimum file size for the files to be deleted from the storage device, wherein the statistics are updated based at least in part on the results of the scan performed include a file size for each file and a timestamp of a last modification for each file;
    processing information associated with the storage device by at least:
        sorting the files according to, for each file, the file size and the timestamp; and
        determining, based at least in part on the sorted files, one or more files to delete from the storage device, wherein file sizes of the one or more files are equal to or greater than the computed minimum file size; and
    deleting the determined one or more files from the storage device such that the files remaining on the storage device do not exceed the quota size.

2. The computer-implemented method of claim 1, wherein the statistics related to the files stored on the storage device is identified by at least:
    performing, based at least in part of a predetermined schedule, a recursive analysis of a root directory, the recursive analysis including:
        identifying a set of files maintained in the root directory;
        providing for display, for each file of the set of files, a statistic based at least in part on a size of the file; and
        providing for display, for each file, a statistic based at least in part on a timestamp of the last modification of the file.

3. The computer-implemented method of claim 1, wherein determining the one or more files to delete from the storage device, further includes:
    identifying each of the one or more files with a file size greater than a median file size;
    identifying each of the one or more files with a timestamp of the last modification for the file being older than a median time since the last modification; and
    generating a hierarchy of each of the one or more files, the hierarchy based at least in part on the file size from largest to smallest and/or the timestamp from oldest to most recent.

4. The computer-implemented method of claim 1, wherein determining the one or more files to delete from the storage device further includes:
    wherein the sorting the files is a first sorting; and
    if a collective file size of the one or more files is not equal to or greater than the computed minimum file size, performing a second sorting the files stored on the storage device, the second sorting including sorting each file according to a different statistic based at least in part on a size of the file and a different statistic based at least in part on a timestamp of the last modification of the file.

5. A system, comprising:
    memory to store instructions which, if executed by one or more processors of the system, cause the system to at least:
        monitor, at a web-based storage service, storage capacity of a storage device;
        determine, based at least in part on the storage capacity, a quota size for file system logs to remain on the storage device and a type of scan to be performed;
        calculate, based at least in part on statistics related to the file system logs stored on the storage device and the storage capacity generated by performing the scan, a minimum file size for the file system logs to be deleted from the storage device, the statistics include a file size for each file system log and a timestamp of a last modification for each file system log;
        sort the file system logs according to, for each file, the file size and the timestamp;
        determine, based at least in part on the sorted file system logs, one or more file system logs to delete from the storage device, wherein file sizes of the one or more file system logs are equal to or greater than the calculated minimum file size; and
        delete the determined one or more file system logs from the storage device such that the file system logs remaining on the storage device do not exceed the quota size.

6. The system of claim 5, further comprising instructions, if executed by the one or more processors, cause the system to at least:
    calculate the minimum file size for the file system logs by at least applying one or more heuristics to the file system logs to determine candidates to be deleted; and
    the one or more heuristics are based at least in part on a file size for each of the file system logs and a timestamp of a modification for each of the file system logs.

7. The system of claim 6, wherein the one or more heuristics are applied based at least in part on a prioritization function configured to prioritize the file system logs based at least in part on a file size and/or file system logs with a timestamp of a modification.

8. The system of claim 5, further comprising instructions, if executed by the one or more processors, cause the system to at least:
    monitor the storage capacity of the storage device; and
    determine if an amount of unavailable storage capacity is greater than a first percentage of a total amount of storage capacity.

9. The system of claim 8, wherein, if the amount of unavailable storage capacity is greater than a first percentage of the total amount of the storage capacity, the file system logs from the storage device are maintained.

10. The system of claim 8, wherein, if the amount of unavailable storage capacity is greater than a first percentage of the total amount of the storage capacity, the one or more processors further cause the system to at least:
    determine a number of iterations of monitoring the storage capacity availability of the storage device; and
    perform a recursive analysis of a root directory, if the number of iterations is greater than a preset number of iterations.

11. The system of claim 10, wherein the recursive analysis is performed by at least:

identify each file maintained in the root directory;

provide for display, for each file, statistics related to the file size; and provide for display, for each file, statistics related to a timestamp of the file.

12. The system of claim 5, further comprising instructions, if executed by the one or more processors, cause the system to at least:

identify the file system logs being deleted;

collect metadata related to the file system logs being deleted; and generate statistics related to the file system logs being deleted.

13. A non-transitory computer-readable storage medium having stored thereon executable instructions that, as a result of being executed by one or more processors of a computer system, cause the computer system to at least:

detect, at a web-based storage service, based at least in part on storage that is in excess of a storage capacity threshold of a storage device, a storage capacity indicating a percentage of a total storage capacity of the storage device;

determine, based at least in part on the storage capacity, a quota size for files to remain on the storage device and a scan to be performed;

compute, based at least in part on using statistics related to files stored on a storage device and the storage capacity obtained from performing the scan, a minimum file size for the files to be deleted from the storage device, wherein the statistics including at least two parameters;

sort the files according to the at least two parameters;

determine, based at least in part on the sorted files, one or more files to delete from the storage device, wherein file sizes of the one or more files are equal to or greater than the computed minimum file size; and delete one or more of the files of the storage device such that the files remaining on the storage device do not exceed the quota size.

14. The non-transitory computer-readable storage medium of claim 13, wherein the instructions further comprise instructions that, as a result of being executed by the one or more processors, cause the computer system to apply a configuration policy to determine one or more files to delete from the storage device, wherein the configuration policy provides logic pertaining to access control of deletable files.

15. The non-transitory computer-readable storage medium of claim 13, wherein the instructions further comprise instructions that, as a result of being executed by the one or more processors, cause the computer system to recursively identify files of a root directory.

16. The non-transitory computer-readable storage medium of claim 15, wherein the instructions that cause the computer system to identify the files of the root directory further include instructions that cause the computer system to perform a recursive analysis of the root directory based at least in part on a schedule.

17. The non-transitory computer-readable storage medium of claim 13, wherein the instructions further comprise instructions that, as a result of being executed by the one or more processors, cause the computer system to adjust the storage capacity threshold of the storage device according to a hierarchy of the at least two parameters, wherein the hierarchy is based at least in part on size information of the file and/or time information of the file.

18. The non-transitory computer-readable storage medium of claim 17, wherein:

the instructions that cause the computer system to sort the files further include instructions that cause the computer system to create a priority order based at least in part on the at least two parameters; and the priority order is organized according to size information of the file and according to time information of the file.

19. The non-transitory computer-readable storage medium of claim 13, wherein the instructions further comprise instructions that, as a result of being executed by the one or more processors, cause the computer system to determine a type of scan to perform on the storage device based at least in part on the storage capacity of the storage device.

20. The non-transitory computer-readable storage medium of claim 19, wherein the instructions that cause the computer system to determine the type of scan to perform based at least in part on the storage capacity of the storage device further include instructions that cause the computer system to:

in response to the storage capacity being greater than half of the total storage capacity of the storage device, perform a shallow scan; and in response to the storage capacity being less than half of the total storage capacity of the storage device, perform a deep scan.

* * * * *